United States Patent [19]

Faber et al.

[11] Patent Number: 5,489,639
[45] Date of Patent: Feb. 6, 1996

[54] COPPER SALTS FOR LASER MARKING OF THERMOPLASTIC COMPOSITIONS

[75] Inventors: Rein M. Faber; Theodorus L. Hoeks, both of AS Bergen op Zoom; Andre Volkers, SK Serooskerke, all of Netherlands

[73] Assignee: General Electric Company, Pittsfield, Mass.

[21] Appl. No.: 292,644

[22] Filed: Aug. 18, 1994

[51] Int. Cl.$^6$ ............................................. C08K 3/32
[52] U.S. Cl. ........................... 524/417; 524/418; 524/423; 523/137; 430/200; 430/945
[58] Field of Search ....................... 430/200, 945; 523/137; 524/417, 418, 423

[56] References Cited

U.S. PATENT DOCUMENTS

| | | | |
|---|---|---|---|
| 4,148,841 | 4/1979 | Schwartz, Jr. | 524/423 |
| 4,152,368 | 5/1979 | Dorfman et al. | 524/423 |
| 4,567,220 | 1/1986 | Schüler et al. | 524/413 |
| 4,622,284 | 11/1986 | West et al. | 430/290 |
| 4,959,406 | 9/1990 | Foltin et al. | 524/413 |
| 5,053,440 | 10/1991 | Schueler et al. | 523/137 |
| 5,075,195 | 12/1991 | Bäbler et al. | 430/200 |
| 5,188,923 | 2/1993 | Ahn et al. | 430/270 |

OTHER PUBLICATIONS

TOXW A17 from Polymer Chemistr, Week 8530 p. 25, J6–A.

*Primary Examiner*—Kriellion S. Morgan

[57] ABSTRACT

A laser markable thermoplastic composition which contains a copper phosphate salt such as copper phosphate, copper sulfate, cupric hydroxide phosphate and copper thiocyanate. The copper phosphate salt is preferably added in an amount ranging from about 0.1 to 5 parts by weight and the copper phosphate salt preferably has a particle size less than 10 μm. The laser markable thermoplastic composition can be laser marked to provide a visibly distinct and separately identifiable region which preferably differs in overall color from the base material by a Delta E value of at least 10–20.

17 Claims, No Drawings

COPPER SALTS FOR LASER MARKING OF THERMOPLASTIC COMPOSITIONS

BACKGROUND OF THE INVENTION

It is known to make a polymeric material which can be inscribed by means of laser light by mixing in a filler which changes color under the effect of energy radiation. If it is desired to keep the costs of fillers low, only a partial amount of filler is mixed in with the polymeric base material (DE-OS 2,936,926). In particular, a high-contrast light-colored inscription in the natural color of the plastic on a black background can be produced on the plastic surface by laser irradiation after incorporating 0.08 to 0.125% carbon black or graphite as filler. The whiteness of the characters can be improved by optical brighteners which are added to the pigments and which are not destroyed by the laser light (German patent No. 3,044,722).

Also known are molded articles consisting of thermoplastics which contain a polymer having aromatic structure, which exhibit very good black coloring due to laser irradiation even without an additive which can change color. However, as the various grades of thermoplastics react very differently, there must be considerable coordination of process parameters, and possibly also of material modifications. It is also important to have color which is adjusted optimally for the laser light and of which the light stability remains in the usual limits for the product class concerned. In the case of large molded articles, restrictions in processing are encountered, depending on the grade of thermoplastic (Kunststoffe 78 (1988), issue 8, pages 688 to 691).

A material which can be inscribed well by laser and which has good thermal stability and stress cracking resistance is obtained by mixing polycarbonate with 10 to 50% of an aromatic polyester (European Patent No. 0,249,082).

Finally, a process for the laser inscription of high-molecular weight organic materials is known in which good inscription properties are achieved by incorporating additives (European Patent No. 0,190,997). In particular, commercially available pigments and/or polymer-soluble dyes are used as coloring additives. An inscription of adequate contrast on the surface of the materials of which the color has been adjusted with these additives can be produced by means of a Nd-YAG laser preferably of doubled frequency (wavelength 532 nm after frequency doubling).

Consequently, according to the prior art, a polymeric composition can be adjusted in such a way that it can be inscribed by laser light, whether by choosing a grade of thermoplastic having good laser inscription properties or by incorporating an additive which changes color under the effect of laser irradiation.

However, in most cases the amount of color contrast which is achieved by known methods is not as high as desired. Accordingly, there is a constant need for additives which can cause significant color changes to occur in the polymeric materials in which it is incorporated. Moreover, it is highly desirable that these additives not deliteriously affect the beneficial physical properties of the polymers.

SUMMARY OF THE INVENTION

The present invention provides a laser markable thermoplastic composition comprising at least one thermoplastic resin composition suitable for laser marking and at least one copper salt selected from copper phosphate, copper sulfate, cupric hydroxide phosphate and copper thiocyanate. The copper phosphate salt is used in an amount sufficient to cause the laser markable thermoplastic composition to absorb laser light outside the visible spectrum. Those portions of the composition which are so exposed have a visibly distinct and separately identifiable color as compared to the base polymer composition.

DETAILED DESCRIPTION OF THE INVENTION

Most plastic resins may be effectively lasermarked through the inclusion of the copper salts according to the present invention. For example, the present invention may employ virtually any plastic resin which has a base color that allows for effective laser marking of the resin and which is not significantly degraded by the copper salts or which does not require such high processing temperatures that the copper salts are degraded during processing of the resin. According to these criteria, and depending upon the specific processing parameters, the plastic material may comprise either synthetic or modified natural materials, e.g., cellulose derivatives and plastics which are obtained by polymerization, polycondensation, and polyaddition. At least the following plastic resins, including blends, copolymers and composites thereof can be suitable for lasermarking: polyolefins, polycarbonates, polyesters, rubber modified monovinylidene aromatic resins, polyetherimides, polyamides, polyester carbonates, polyphenylene sulfides, polyamideimides, polyesteramides, polyether esters, polyetherimide esters, polyarylates, polymethylpentenes, polysulfones, polyethersulfones, polystyrenes, rubber modified high impact polystyrenes, acetyls, styrene maleic anhydride copolymers, acrylonitrile styrene acrylate copolymers, polyphenylene ethers, polyether ketones, chlorinated polymers, fluorinated polymers, and liquid crystal polymers.

Thermoplastic resins are the most preferred plastic resins and, given the light base color and relatively mild processing conditions, polyesters, polycarbonates and rubber modified monovinylidene aromatic resins and their blends are particularly well suited for laser marking according to the present invention.

Through their extensive research, Applicants discovered that there are several copper salts which are surprisingly well suited for laser marking of plastic resins. In particular, the copper salts include copper II (cupric) phosphate, copper sulfate, cupric hydroxide phosphate and copper I (cuprous) thiocyanate. Applicants also discovered that a number of copper salts were not suited for laser marking of plastic resins. For example, because of their high volatility, etc., copper salts such as copper acetate, copper naphthenate and copper acetylacatonate were deemed to be unsuitable for laser marking. Similarly, other copper salts such as copper iodide, copper sulphide and copper oxide were also discovered not to be suitable for laser marking because they are black in color and/or because they do not provide adequate color contrast after exposure to laser light.

In addition to the copper salts of the invention, it may be convenient to add an additional colorant or mixture of colorants to the plastic resin. The colorant or mixture of colorants may, however, only be added in such a concentration that the laser marking produced in the practice of this invention is not impaired. Depending on the plastic resin the concentration is typically between about 0.01 to about 5% by weight.

Suitable additional colorants are inorganic or organic pigments as well as polymer-soluble dyes.

Examples of inorganic pigments are white pigments such as titanium dioxides (anatas, rutile), zinc oxide, antimony oxide, zinc sulfide, lithopones, basic lead carbonate, basic lead sulfate or basic lead silicate, and also colored pigments such as iron oxides, nickel antimony titanate, chromium antimony titanate, manganese blue, manganese violet, cobalt blue, cobalt chromium blue, cobalt nickel grey or ultramarine blue, Berlin blue, lead chromates, lead sulfochromates, molybdate orange, molybdate red, cadmium sulfides, antimony trisulfide, zirconium silicates such as zirconium vanadium blue and zirconium preseodyme yellow, and also carbon black or graphite in low concentration, and also other pigments such as aluminum pigments or mixed phase pigments in platelet form, e.g., iron oxide in platelet form doped with $Al_2O_3$ and/or $Mn_2O_3$, as well as pearlescent pigments such as basic lead carbonate, bismuth oxychloride, bismuth oxychloride on carrier and, in particular, the titanium dioxide-coated mica pigments, which last mentioned pigments may also contain other colored metal oxides such as iron oxides, cobalt oxides, manganese oxides or chromium oxides.

Examples of organic pigments are azo, azomethine, methine, anthraquinone, indanthrone, pyranthrone, flavanthrone, benzanthrone, phthalocyanine, perinone, perylene, dioxazine, thioindigo, isoindoline, isoindolinone, quinacridone, pyrrolopyrrole or quinophthalone pigments, and also metal complexes, for example of azo, azomethine or methine dyes or metal salts of azo compounds as well as organic pigments in platelet form.

Suitable polymer-soluble dyes are, for example, disperse dyes such as those of the anthraquinone series, for example hydroxyanthraquinones, aminoanthraquinones, alkylaminoanthraquinones, hydroxyaminoanthraquinones or phenylmercaptoanthraquinones, as well as metal complexes of azo dyes, in particular 1:2 chromium or cobalt complexes of monoazo dyes, and fluorescent dyes such as those of the coumarin, naphthalimide, pyrazoline, acridine, xanthene, thioxanthene, oxazine, thiazine or benzthiazole series.

In the practice of this invention, the inorganic or organic pigments or polymer-soluble dyes can be used singly or as mixtures, conveniently with or without pigment additives.

Suitable pigment additives are typically fatty acids of at least 12 carbon atoms, for example stearic acid or behenic acid and the amides, salts or esters thereof such as magnesium stearate, zinc stearate, aluminum stearate or magnesium behenate, and also quaternary ammonium compounds such as tri($C_1$–$C_4$)alkylbenzylammonium salts, waxes such as polyethylene wax, resin acids such as abietic acid, colophonium soap, hydrogenated or dimerised colophonium, $C_{12}$–$C_{18}$-paraffin disulfonic acids or alkylphenols, alcohols such as TCD-Alcohol M®, or vicinal aliphatic 1,2-diols.

The preparation of the plastic resins is effected by methods which are known per se, for example by incorporating the necessary colored components (molybdenum disulfide and an optional additional colorant) which may be in the form of a masterbatch, into the substrates using extruders, roll mills, mixing or grinding machines. The resultant resin is then brought into the desired final form by methods which are known per se, for example calendering, molding, extruding, coating, casting or by injection molding. It is often desirable to incorporate plasticizers into the organic material before-processing in order to produce non-brittle moldings or to diminish their brittleness. Suitable plasticizers are, for example, esters of phosphoric acid, of phthalic acid or of sebacic acid. The plasticizers may be incorporated before or after working coloring components into the polymers.

Depending on the end use, further modifiers may be added to the plastic resins, for example fillers such as kaolin, mica, feldspar, wollastonite, aluminum silicate, barium sulfate, calcium sulfate, chalk, calcite and dolomite, as well as light stabilizers, antioxidants, flame retardants, heat stabilizers, glass fibres or processing auxiliaries conventionally employed in the processing of plastics and known to the skilled person.

The thermoplastic resin composition may also include other additives which are well known in the art. For example, the resin composition may contain external lubricants, antioxidants, flame retardants or the like. If desired, ultraviolet stabilizers, flow aids, metal additives for electromagnetic radiation shielding such as nickel coated graphite fibers, anti static agents, coupling agents such as amino silanes and the like may also be added.

Energy-rich pulsed laser sources are used for marking the plastic resins according to the practice of this invention. The procedure comprises applying the radiation energy, in conformity with the shape of the marking which is to be applied, conveniently at a steep angle to the surface of the material to be marked, and focusing said radiation energy such that visibly distinct and separately identifiable marking is produced at the areas of impact without the surface of the marked material being perceptibly damaged.

Examples of such energy source are solid state pulsed lasers such as ruby lasers or frequency multiplied Nd:YAG lasers, pulsed lasers with booster such as pulsed dye lasers or Raman shifter, and also continuous wave lasers with pulse modifications (Q-switch, mode locker), for example on the basis of CW Nd:YAG lasers with frequency multiplier, or CW ion lasers (Ar, Kr), as well as pulsed metal vapor lasers, for example copper vapor lasers or gold vapor lasers, or high capacity pulsed semi-conductor lasers which emit visible light by frequency doubling, and also pulsed gas lasers such as excimer and nitrogen lasers.

Depending on the laser system employed, pulse contents of up to several Joules per $cm^2$, intensifies of up to $10^{12}$ $W/cp^2$, pulse durations of from $10^{-15}$ seconds to $10^{-6}$ seconds and frequencies of up to $10^9$ Hz are possible. Pulse contents of micro-Joule to kilo-Joule, intensities of kilowatt/$cm^2$ to 100 megawatt/$cm^2$, pulse durations of microseconds to picoseconds, and frequencies of a few hertz to 50 kilohertz are advantageously used.

Preferred lasers are pulsed or pulse-modified, frequency doubled Nd:YAG lasers or metal vapor lasers such as gold or, in particular, copper vapor lasers, as well as excimer lasers.

The following table lists a number of commercially available lasers which may be suitably used in the practice of this invention.

TABLE

| Type/Representative | Examples of commercially available types | Principal wavelength (subsidiary wavelengths) [nm] |
|---|---|---|
| Solid state pulsed lasers | | |
| Ruby laser | Lasermetrics (938R6R4L-4) | 694 (347) |
| Nd:YAG laser | Quanta Ray (DC 2A) | 1064, (532, 355, 266) |
| Alexandrite laser | Apollo (7562) | 730–780 |
| Pulsed lasers with booster such as | | |
| Raman shifter | Quanta Ray (RS-1) | UV-IR |
| Dye laser | Lambda Physik FL 2002 | ca. 300–1000 |
| CW laser with pulse modification | | |
| ND:YAG (Q-Switch, 2ω) | Lasermetrics (9560QTG) | 532 |
| Argon (mode-locked) | Spectra-Physics SP 2030 | 514.5, 488 |
| Pulsed metal vapor laser | | |
| Cu vapor laser | Plasma-Kinetics 751 | 510, 578 |
| Au vapor laser | Plasma-Kinetics | 628 |
| Mn vapor laser | Oxford | 534, 1290, |
| Pb vapor laser | Laser CU 25 | 723 |
| Semi-conductor diode lasers | M/ACOM Type LD 65 | ca. 905, (402) |
| Semi-conductor diode laser array | STANTEL Type LF 100 | ca. 905 (402) |
| Pulsed gas lasers Excimer | | |
| XeCl | Lambda Physik | 308 |
| XeF as well as | EMG-103 | 351 |
| $N_2$ | | 337 |

Lasers whose parameters can be readily adjusted, for example pulse content and pulse duration, permit the best possible adaptation to the requirements of the materials to be marked.

The best wavelength to be selected for the irradiation is that at which the radiation-sensitive copper salts and the optional additional colorant absorbs most strongly, and that at which the plastics material to be marked absorbs little.

Preferably laser light with a wavelength in the IR range is used. The "near IR range" as meaning the range from about 0.78 μm to about 2 μm.

Three different methods are normally suitable for laser marking in the practice of this invention: the mask method, the linear marking method and the dot matrix method. In these last two mentioned methods (dynamic focusing), the laser is preferably combined with a laser marking system, so that the plastics material can be marked with any, e.g. computer-programmed, digits, letters and special symbols.

The choice of laser system in respect to capacity and frequency depends basically on the marking method employed. The high capacity and low frequency of, e.g., solid state pulsed lasers and excimer lasers are preferred for mask exposure. The average to low capacities and rapid frequencies of pulsed metal vapor lasers or of continuous wave lasers with pulse modifications are preferred for producing markings that require dynamic focusing. Beam deflection can be effected, for example, acousto-optically, holographically, with galvo-mirrors or polygon scanners. Dynamic focusing makes possible an extremely flexible marking, as the marks can be produced electronically.

EXAMPLE 1

This example demonstrates several of the copper salts which were found to provide effective laser marking of thermoplastic resins. The copper compounds were evaluated in a thermoplastic polyester sold by General Electric Co. as Valox® 325C, a grade specially developed for keycap applications.

A Nd/YAG laser, operating at a wavelength of 1064 nm was used to mark the disks. Apart from the material composition, the laser settings were of relatively major importance. The optimal settings were dependent on scan speed, lamp current, Q-switch and mode blender. To determine the optimal settings, the lamp current and Q-switch were varied as function of the scan speed. Former results indicated that the mode blender should have a diaphragm of 1.0 mm. The settings providing the best contrast were used to mark a small square (1*1 cm). This area allowed a measurement of color differences of the background and the marked area (CieLab method, DIN 6174, source D65). A Delta E value of 20 is generally considered as sufficient.

| | A. Copper Sulfate | | | | | |
|---|---|---|---|---|---|---|
| | 1 | 2 | 3 | 4 | 5 | 6 |
| Valox ® 325C | 100 | 100 | 100 | 100 | 100 | 100 |
| Titanium | 2.8 | 4.3 | 4.3 | 4.3 | 4.3 | 4.3 |

-continued

| | | | | | | |
|---|---|---|---|---|---|---|
| dioxide | | | | | | |
| Carbon black | 0.015 | 0.015 | 0.015 | 0.015 | 0.015 | 0.015 |
| Copper sulfate (solid) | | 1.5 | | | | |
| Copper sulfate (solution) | | | 0.05 | 0.1 | 0.5 | 1.5 |
| Delta E | 12.5 | 16.7 | 21.3 | 21.4 | 19.1 | 14.8 |

B. Copper Phosphate

| | 1 | 7 | 8 | 9 | 10 | 11 |
|---|---|---|---|---|---|---|
| Valox ® 325C | 100 | 100 | 100 | 100 | 100 | 100 |
| Titanium dioxide | 2.8 | 4.3 | 4.3 | 4.3 | 4.3 | 4.3 |
| Carbon black | 0.015 | 0.015 | 0.015 | 0.015 | 0.015 | 0.015 |
| Copper phosphate (PS = 30 μm) | | 3 | | | | |
| Copper phosphate (PS = 15 μm) | | 3 | 1.5 | | | |
| Copper phosphate (PS = 6 μm) | | | | | 3 | 1.5 |
| Delta E | 12.5 | 17.7 | 23.6 | 20.6 | 25.4 | 24.1 |

[4]PS = particle size, 90% of particles is smaller than given number.

C. Copper Thiocyanate

| | 1 | 12 | 13 | 14 | 15 |
|---|---|---|---|---|---|
| Valox ® 325C | 100 | 100 | 100 | 100 | 100 |
| Titanium dioxide | 2.8 | 4.3 | 4.3 | 4.3 | 4.3 |
| Carbon black | 0.015 | 0.015 | 0.015 | 0.015 | 0.015 |
| Copper thiocyanate (PS = 0.4 μm) | | 0.75 | 1.0 | 1.5 | 3 |
| Delta E | 12.5 | 20 | 21.9 | 23.3 | 19.9 |

D. Copper Thiocyanate

| | 16 | 17 | 18 |
|---|---|---|---|
| Valox ® 325C | 100 | 100 | 100 |
| Titanium dioxide | 2.8 | 4.3 | 4.3 |
| Copper thiocyanate (PS[4] = 0.4 μm) | | 1.5 | 3 |
| Delta E | 25.5 | 36.6 | 38.5 |

Addition of 3 pbw of copper thiocyanate to a Valox® 325C formulation, improved the sensibility for the $CO_2$-laser significantly. Without the laser sensitive additive, the plastic material was just ablated, while in the case where the additive was present, a grey-brown symbol appeared after irradiation.

EXAMPLE 2

A direct comparison was carried out between Cupric phosphate, Cuprous thiocyanate and Cuptic hydroxide phosphate as possible contrast enhancing additives.

The following additives were evaluated in a polyester resin manufactured by General Electric and sold under the trademark Valox® 325C.

Additives used:

Cupric hydroxide phosphate; Aldrich 34,440-0, 97%.

Cupric phosphate; Scmidt B. V. M13-3[2]

Cuprous thiocyanate; HCA Holland Colors

All laser experiments were carried out using a Nd:YAG 1064 nm laser. Model LBI 6000. Supplier; Carl Baasel lasertechnik GmbH. Focus: 160 mm, Working distance: 180 mm.

Laser settings were optimized in the same way as Example 1. Contrast has been measured and defined as delta E (marked area versus background) according to CieLab method, DIN 6174, source D65.

| A. Cupric hydroxide phosphate | | | | | | |
|---|---|---|---|---|---|---|
| Cu2(OH)PO4 (pbw) | 0 | 0.5 | 1 | 1.5 | 2 | 3 |
| (composition in pbw) | | | | | | |
| Valox ® 325C | 100 | 100 | 100 | 100 | 100 | 100 |
| Titanium dioxide | 4.3 | 4.3 | 4.3 | 4.3 | 4.3 | 4.3 |
| Carbon Black | 0.015 | 0.015 | 0.015 | 0.015 | 0.015 | 0.015 |
| (laser settings) | | | | | | |
| Modeblendor (mm) | 1.0 | 1.0 | 1.0 | 1.0 | 1.0 | 1.0 |
| Lampcurrent (Ampere) | 18 | 16 | 14 | 14 | 14 | 14 |
| Q-switch (Herz) | 2000 | 2000 | 2000 | 2000 | 2000 | 2000 |
| Speed (mm/s) | 200 | 175 | 225 | 225 | 225 | 225 |
| Wobble (mm) | 0 | 0 | 0 | 0 | 0 | 0 |
| delta E | 16.3 | 15.8 | 18.9 | 20.4 | 23.2 | 21.7 |

| B. Cupric phosphate | | | | | | |
|---|---|---|---|---|---|---|
| $Cu_3(PO_4)_2$ (pbw) | 0 | 0.5 | 1 | 1.5 | 2 | 3 |
| (composition in pbw) | | | | | | |
| Valox ® 325C | 100 | 100 | 100 | 100 | 100 | 100 |
| Titanium dioxide | 4.3 | 4.3 | 4.3 | 4.3 | 4.3 | 4.3 |
| Carbon Black | 0.015 | 0.015 | 0.015 | 0.015 | 0.015 | 0.015 |
| (laser settings) | | | | | | |
| Modeblendor (mm) | 1.0 | 1.0 | 1.0 | 1.0 | 1.0 | 1.0 |
| Lampcurrent (Ampere) | 16 | 16 | 14 | 14 | 14 | 14 |
| Q-switch (Herz) | 2000 | 2000 | 2000 | 2000 | 3000 | 3000 |
| Speed (mm/s) | 225 | 200 | 200 | 200 | 225 | 225 |
| Wobble (mm) | 0 | 0 | 0 | 0 | 0 | 0 |
| delta E | 16.3 | 17.2 | 18.8 | 20.8 | 20.7 | 22.6 |

| C. Cuprous thiocyanate | | | | |
|---|---|---|---|---|
| CuSCN (pbw) | 0 | 0.5 | 1 | 1.5 |
| (composition in pbw) | | | | |
| Valox ® 325C | 100 | 100 | 100 | 100 |
| Titanium dioxide | 4.3 | 4.3 | 4.3 | 4.3 |
| Carbon Black | 0.015 | 0.015 | 0.015 | 0.01 |
| (lasersettings) | | | | |
| Modeblendor (mm) | 1.0 | 1.0 | 1.0 | 1.0 |
| Lampcurrent (Ampere) | 16 | 16 | 14 | 14 |
| Q-switch (Herz) | 2000 | 2000 | 2000 | 2000 |
| Speed (mn/s) | 225 | 225 | 225 | 225 |
| Wobble (mm) | 0 | 0 | 0 | 0 |
| delta E | 16.3 | 18.8 | 22.3 | 24.7 |

Obviously, other modifications and variations of the present invention are possible in light of the above teachings. It is, therefore, to be understood that changes may be made in the particular embodiments described above which are within the scope of the invention as defined in the appended claims.

We claim:

1. A laser markable thermoplastic composition, comprising:
   (a) at least one thermoplastic resin composition suitable for laser marking; and
   (b) at least one copper salt selected from the group consisting of copper phosphate, copper sulfate, and copper thiocyanate, wherein said copper salt is present in an amount sufficient to cause said laser markable thermoplastic con, position to absorb a laser light outside the visible spectrum such that the portion of said composition which absorbs said laser light has a visibly distinct and separately identifiable color.

2. The thermoplastic composition of claim 1, wherein the wavelength of said laser light is above about 900 nm.

3. The thermoplastic composition of claim 1, wherein said copper salt is copper phosphate or copper thiocyanate.

4. The thermoplastic composition of claim 1 wherein said thermoplastic resin comprises at least one resin selected from polycarbonate, polyester, rubber modified monovinylidene aromatics, polyetherimide, polyesteramides, polyamide, polyester carbonates, polyphenylene sulfide, polyamideimide, polyether esters, polyetherimide esters, polyarylate, polymethylpentene, polysulfone, polyethersulfone, polystyrene, rubber modified high impact polystyrene, acetyl, polyphenylene ether, polyether ketone, chlorinated polymer, fluorinated polymer, liquid crystal polymer, copolymers of the above, or blends of the above.

5. The thermoplastic composition of claim 4, wherein said thermoplastic resin comprises polyester, polycarbonate, polyestercarbonate, rubber modified monovinylidene aromatics, polyetherimides, polyesteramides, polyetherester, polyetherimide ester, or copolymers or blends of the above.

6. The thermoplastic composition of claim 5, wherein said thermoplastic resins comprises polycarbonate, polyalkylene terephthalate, rubber modified monovinylidene aromatics, or copolymers or blends of the above.

7. The thermoplastic composition of claim 2, wherein the amount of said copper salt ranges from about 0.05 to about 10 parts by weight of the thermoplastic composition.

8. The thermoplastic composition of claim 7, wherein the amount of said copper salt ranges from about 0.1 to about 5 parts by weight of the thermoplastic composition.

9. The thermoplastic composition of claim 1, wherein the amount of said copper salt ranges from about 0.5 to about 3 parts by weight of the thermoplastic composition.

10. The thermoplastic composition of claim 2, wherein the particle size of said copper salt is less than about 10 µm.

11. The thermoplastic composition of claim 10, wherein the particle size of said copper salt is less than about 1 µm.

12. The thermoplastic composition of claim 2, wherein the total color difference between the base composition and the portion which absorbed said laser light is at least 10 units as measured by the Delta E.

13. The thermoplastic composition of claim 12, wherein the total color difference between the base composition and the portion which absorbed said laser light is at least 15 units as measured by the Delta E.

14. The thermoplastic composition of claim 13, wherein the total color difference between the base composition and the portion which absorbed said laser light is at least 20 units as measured by the Delta E.

15. The thermoplastic composition of claim 2, wherein said composition further comprises carbon black or titanium dioxide.

16. A laser markable article of manufacture comprising the composition of claim 1.

17. A process for producing a laser markable thermoplastic composition comprising extruding the composition of claim 1.

* * * * *